US010733020B2

(12) United States Patent
Mani et al.

(10) Patent No.: US 10,733,020 B2
(45) Date of Patent: Aug. 4, 2020

(54) RESOURCE ALLOCATION STATE MANAGEMENT

(71) Applicant: Microsoft Technology Licensing, LLC, Redmond, WA (US)

(72) Inventors: Ajay Mani, Woodinville, WA (US); Esaias E. Greeff, Redmond, WA (US); David A. Dion, Bothell, WA (US); Shailesh P. Joshi, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 137 days.

(21) Appl. No.: 15/955,387

(22) Filed: Apr. 17, 2018

(65) Prior Publication Data
US 2019/0317811 A1    Oct. 17, 2019

(51) Int. Cl.
*G06F 9/46* (2006.01)
*G06F 9/50* (2006.01)
*G06F 9/455* (2018.01)

(52) U.S. Cl.
CPC ........ *G06F 9/5005* (2013.01); *G06F 9/45558* (2013.01); *G06F 9/5077* (2013.01); *G06F 2009/45595* (2013.01)

(58) Field of Classification Search
None
See application file for complete search history.

(56) References Cited

U.S. PATENT DOCUMENTS

| 6,704,489 | B1* | 3/2004 | Kurauchi | H04N 5/765 386/248 |
| 9,229,774 | B1 | 1/2016 | Wilkes et al. | |
| 2005/0117587 | A1* | 6/2005 | Kawato | G06F 9/5027 370/395.21 |
| 2009/0235044 | A1* | 9/2009 | Kisel | G06F 3/0613 711/173 |
| 2009/0320033 | A1* | 12/2009 | Gokhale | G06F 3/0605 718/103 |
| 2012/0054763 | A1* | 3/2012 | Srinivasan | G06F 9/5005 718/104 |

(Continued)

OTHER PUBLICATIONS

Delimitrou, et al., "Tarcil: Reconciling Scheduling Speed and Quality in Large Shared Clusters", In Proceedings of the Sixth ACM Symposium on Cloud Computing, Aug. 27, 2015, 14 Pages.

(Continued)

*Primary Examiner* — Diem K Cao
(74) *Attorney, Agent, or Firm* — Mannava & Kang, P.C.

(57) ABSTRACT

According to examples, an apparatus may include a processor and a memory on which is stored machine readable instructions that are to cause the processor to receive an allocation request from an allocator client, determine a resource allocation for the received job allocation request, store a record of the determined resource allocation in a records store, and send the determined resource allocation to the allocator client, in which an acknowledgement to the sent determined resource allocation is to be received from the allocator client. The instructions may also cause the processor to manage a state of the determined resource allocation using the record stored in the records store based on whether the acknowledgement is received from the allocator client.

20 Claims, 4 Drawing Sheets

(56) References Cited

U.S. PATENT DOCUMENTS

2016/0323374 A1* 11/2016 Russinovich ....... H04L 67/1025
2019/0018710 A1*  1/2019 Ambardekar ......... G06F 9/5061

OTHER PUBLICATIONS

"International Search Report and Written Opinion Issued in PCT Application No. PCT/US2019/025267", dated Jun. 4, 2019, 11 Pages.

Schwarzkopf, et al., "Omega: Flexible, Scalable Schedulers for Large Compute Clusters", In Proceedings of SIGOPS European Conference on Computer Systems, Apr. 15, 2013, pp. 351-364.

* cited by examiner

RESOURCE ALLOCATION STATE MANAGEMENT

BACKGROUND

Virtualization allows for multiplexing of host resources, such as machines, between different virtual machines. Particularly, under virtualization, the host resources allocate a certain amount of resources to each of the virtual machines. Each virtual machine may then use the allocated resources to execute computing or other jobs, such as applications, services, operating systems, or the like. The virtual machines may be allocated in various manners to the host resources to meet goals, such as, meeting service level objectives, meeting cost objectives, or the like.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Some systems include a central allocator that allocates resources to multiple distributed clients. To avoid conflicts and overprovisioning of resources, e.g., allocating multiple workloads to the same resources, the central allocator may wait for an acknowledgement of a resource allocation result before processing a next allocation request. In this regard, the central allocator may process one request at a time. Although waiting for acknowledgements in this manner may prevent overprovisioning of the resources, this process may be slow and inefficient and may not scale effectively with increasing numbers of clients.

Disclosed herein are apparatuses and methods for managing a state of a resource allocation such that a processor may efficiently allocate resources to workloads. Particularly, the apparatuses and methods disclosed herein may store a record of a determined resource allocation in a records store (e.g., an escrow) prior to the determined resource allocation being committed to a placement store. The records store may be a temporary storage location that the processor may access, for instance, while determining a resource allocation for a next workload. In one regard, the records store may store records of the resource allocations prior to the processor identifying results (e.g., success, failure, or lack of acknowledgement) of the resource allocations. By considering the records stored in the records store in addition to the resource allocations identified in the placement store during resource allocation determinations, the processor may use an up-to-date view of the resource allocations in making the resource allocation determinations. In one regard, therefore, overprovisioning of the resources, and particularly those resources that have been allocated with a workload but for which the allocation has not yet been committed to the placement store, may be prevented.

Accordingly, and in one regard, through implementation of the apparatuses and methods disclosed herein, a processor may allocate resources for a number of clients without waiting to receive acknowledgements from the clients and while preventing overprovisioning of the resources from occurring. As a result, the processor may allocate a larger number of jobs to resources in the same amount of time as compared with conventional resource allocators while still avoiding overprovisioning of the resources. In other words, through implementation of the apparatuses and methods disclosed herein, a processor may operate to allocate workloads requested from multiple clients in a quick and efficient manner.

In some examples, the processor may use the records in the records store to undo resource allocations for which the processor has not received acknowledgements or has received acknowledgements indicating that the resource allocations were unsuccessful. That is, when an undo operation is to be implemented, the processor may identify the resource to which the allocation was made and may return that resource to the pool of available resources. By doing so, the processor may increase or maximize the pool of available resources, which may enable the processor to more efficiently allocate workloads to the resources. The resource may also sit idle for a shorter period of time and thus, use of the resource may be increased or maximized.

According to examples in which resources may be active components, the processor may update the placement store with the resource allocation. In these examples, the resources may proactively start pulling the workloads that are allocated to the resources from the placement store instead of awaiting receipt of instructions from the clients to start executing or hosting the workloads. As a result, the latency associated with the allocation and initiation of the workload performance may further be reduced through implementation of the apparatuses and methods disclosed herein.

Figure 1:
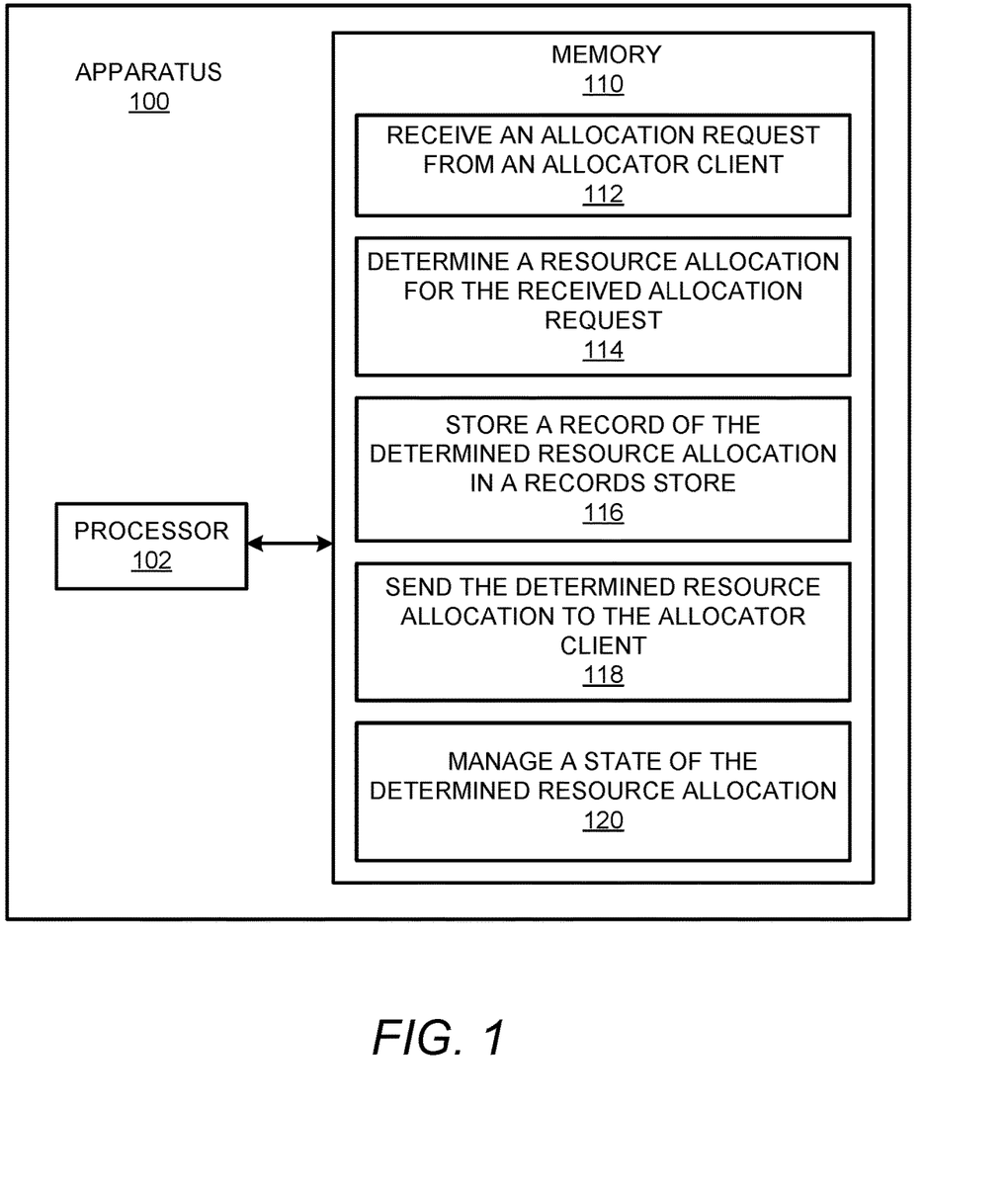
FIG. 1 depicts a block diagram of an apparatus that may manage a state of a resource allocation in accordance with an embodiment of the present disclosure.
Figure 2:
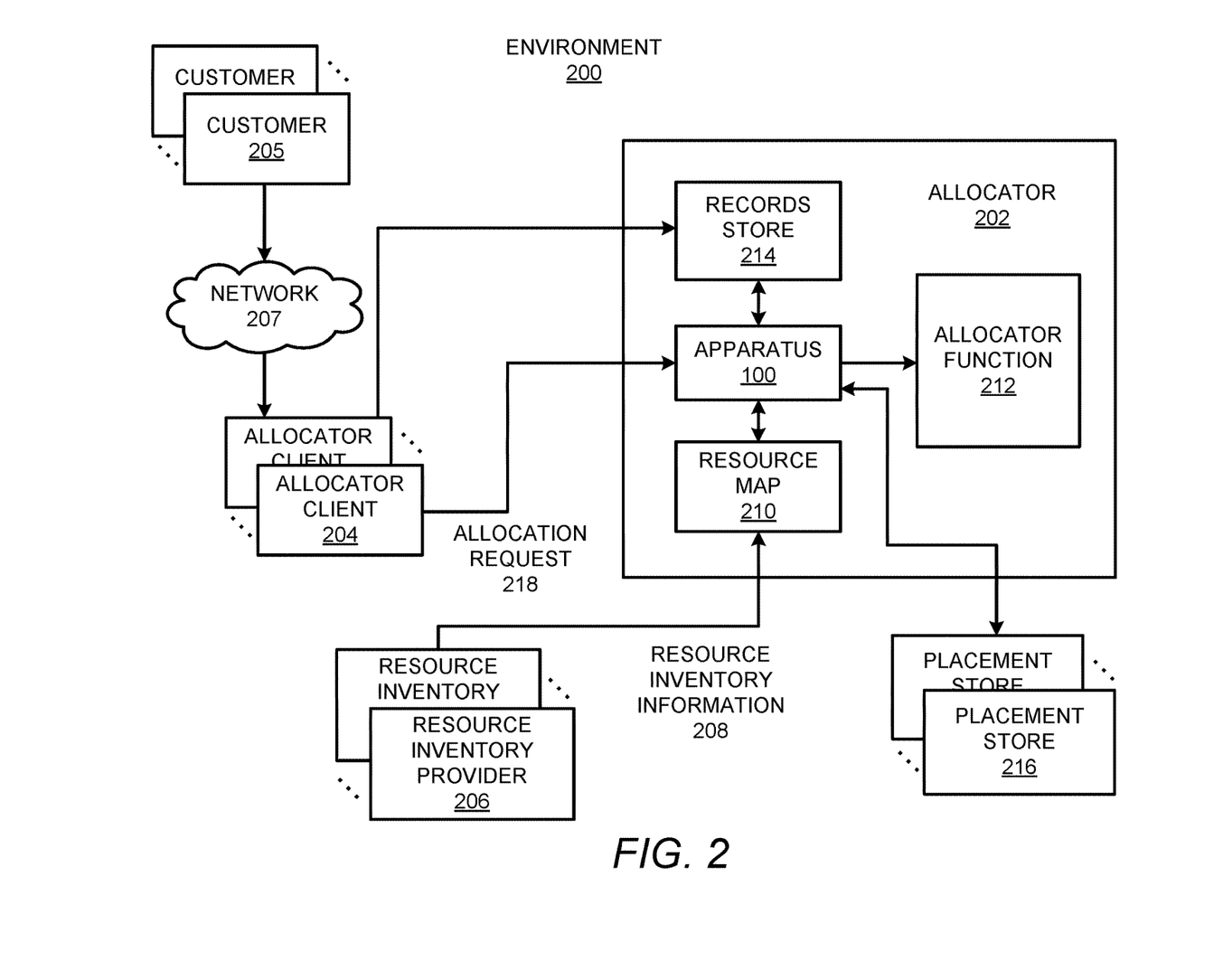
FIG. 2 depicts a block diagram of an environment in which features of the apparatus depicted in FIG. 1 may be implemented in accordance with an embodiment of the present disclosure.

Reference is first made to FIGS. 1 and 2. FIG. 1 depicts a block diagram of an apparatus 100 that may manage a state of a resource allocation in accordance with an embodiment of the present disclosure. FIG. 2 depicts a block diagram of an environment 200 in which features of the apparatus 100 depicted in FIG. 1 may be implemented in accordance with an embodiment of the present disclosure. It should be understood that the apparatus 100 depicted in FIG. 1 and the environment 200 may include additional features and that some of the features described herein may be removed and/or modified without departing from the scopes of the apparatus 100 or the environment 200.

The apparatus 100 may be a server machine, such as a computing device that executes server software. In other examples, the apparatus 100 may be a personal computer, a laptop computer, a tablet computer, or the like. In any regard, the apparatus 100 may include a processor 102, which may be a semiconductor-based microprocessor, a central processing unit (CPU), an application specific integrated circuit (ASIC), a field-programmable gate array (FPGA), and/or other hardware device. Although the apparatus 100 is depicted as having a single processor 102, it should be understood that the apparatus 100 may include additional processors and/or cores without departing from a scope of the apparatus 100.

The apparatus 100 may also include a memory 110, which may be, for example, Random Access memory (RAM), an Electrically Erasable Programmable Read-Only Memory (EEPROM), a storage device, an optical disc, or the like. The memory 110, which may also be referred to as a computer readable storage medium, may be a non-transitory machine-readable storage medium, where the term "non-transitory" does not encompass transitory propagating signals. In any regard, the memory 110 may have stored thereon machine readable instructions 112-120.

As shown in FIG. 2, the apparatus 100 may be in an allocator 202 in the environment 200. The allocator 202 may be a computing device that includes the apparatus 100, e.g., the processor 102 and the memory 110 of the apparatus 100. In some embodiments, the allocator 202 may be equivalent to the apparatus 100, in which case the apparatus 100 depicted in FIG. 2 may be equivalent to the processor 102.

The environment 200 may be a network environment in which customers may submit allocation requests to be allocated to resources (or equivalently, the resources may be allocated to the allocation requests). Particularly, customers 205 may submit allocation requests to allocator clients 204 in the environment 200 via a network 207, which may be the Internet, an intranet, or the like. The resources may be physical machines, e.g., servers, nodes, storage devices, etc., that may host computing workloads, computing jobs, or the like. The resources may also be components within physical machines, such as cpus, cores, graphics processing units, ASICs, etc. By way of particular example, the resources may be nodes or cpus in the nodes that are to be allocated to host virtual machines. The resources may be distributed across one or across multiple data centers and there may be a large number of resources, e.g., hundreds or thousands of resources.

Each of the allocator clients 204 may be an entity, e.g., machine, server, or the like, in the environment 200 that may receive requests from customers 205 and may send allocation requests to the allocator 202, and particularly to the apparatus 100 in the allocator 202. The allocator clients 204 may also be construed as tenant actors that represent tenants (e.g., customers 205) in the environment 200 in the allocation and the execution of resource allocations. The allocator clients 204 may receive allocation requests from the tenants, for instance, during an initial deployment for a tenant, to update a tenant of an existing tenant, to heal a service, or the like. According to examples, the environment 200 may include a large number of allocator clients 204, e.g., hundreds, thousands, or more, such that the allocator 202 may determine resource allocations for the large number of allocator clients 204, and thus, a large number of customers.

The environment 200 may also include resource inventory providers 206 that may maintain respective inventories of nodes (e.g., resources), node resources, node availabilities, and/or the like. The resource inventory providers 206 may be partitioned by nodes. In addition, each of the resource inventory providers 206 may maintain this information for all of the nodes in a respective partition. The resource inventory providers 206 may send information 208 regarding the full inventories of nodes to the allocator 202 and the allocator 202 may store the inventories of nodes in a resource map 210. According to examples, the resource inventory providers 206 may send the information 208 regarding the full inventories of the nodes once or periodically and may send partial updates to the allocator 202. By way of example, the resource inventory providers 206 may send the full inventories and the partial updates through a seed-delta sync mechanism. According to examples, the resource inventory providers 206 may each maintain inventories for a large number of nodes (resources), e.g., hundreds, thousands, or more, of nodes. The large number of nodes may enable the allocator 202 to allocate the resources to the allocation requests efficiently, e.g., the larger the number of available resources, the more efficiently the allocator 202 may allocate the resources to the allocation requests.

The allocator 202 may also include an allocator function 212 and an escrow 214, which may also be referenced herein as a records store or an undo records store. The allocator function 212 may include machine readable instructions that the processor 102 may execute to allocate resources to requested workloads. The allocator function 212 may thus be stored in the memory 110 or in another data store. In addition, the environment 200 may include placement stores 216 that store, for instance, the current allocations of workloads on the resources. The escrow 214 and the placement stores 216 may each be persistent data stores, such as disks, flash memories, or the like, and may be the same data store.

In examples, the placement stores 216 may make the current allocations of workloads on the resources available in instances in which there is a failure and the current state of the resource allocations may be recovered from the current allocations. The placement stores 216 may each be partitioned by nodes and the apparatus 100 (of the allocator 202) may write resource allocations into the placement stores 216. In addition, the allocator clients 204 and/or resources may identify the resource allocations from the placement stores 216. According to examples, the apparatus 100 may write the resource allocations to the placement stores 216 once or periodically and may send partial updates to the placement stores 216. Moreover, the apparatus 100 may read the resource allocations from the placement stores 216, for instance, following a reboot of the apparatus 100, which may occur after a failure of the apparatus 100.

With reference back to FIG. 1, the processor 102 may fetch, decode, and execute the instructions 112 to receive an allocation request 218 from an allocator client 204. Particularly, the allocator client 204 may receive a request from a customer 205 for a computer workload or job to be performed for the customer 205. The allocator client 204 may submit an allocation request 218 to the processor 102 for the requested customer workload. Particularly, for instance, the allocator client 204 may correspond to the customer 205 and a particular partition of the allocator client 204 may submit the allocation request 218 to the processor 102. The allocator client 204 may submit the allocation request 218 via a two-way communication channel between the allocator client 204 and the apparatus 100. According to examples, the allocator client 204 may generate an allocation identifier (ID) for the allocation request 218 and may send the generated allocation ID to the apparatus 100 with the allocation request 218. The allocation ID may identify the allocator client 204 that submitted allocation request 218 along with the allocation request 218.

The processor 102 may fetch, decode, and execute the instructions 114 to determine a resource allocation for the received allocation request 218. Particularly, the processor 102 may send the allocation request 218 or may otherwise access the allocator function 212 to determine a resource allocation for the allocation request 218. The allocator function 212 may take a plurality of parameters as input and may determine a resource allocation for the request, e.g., to determine a resource to execute the request, that meets a predefined goal. For instance, the allocator function 212 may determine a resource allocation that results in a minimization of costs associated with executing the request, in a fulfillment of the request within a predefined time period, in a satisfaction of terms of a service level agreement, or the like. In addition, the parameters may include information contained in the resource map 210, such as an inventory of resources, the allocation request, existing allocations for the allocator client 204, etc. The parameters may also include records stored in the records store 214, such as records of resources allocations that have been determined but that have not been committed to the placement store 216.

The processor 102 may fetch, decode, and execute the instructions 116 to store a record of the determined resource allocation in the records store 214 (e.g., escrow 214). The record of the determined resource allocation may include the allocation ID such that the determined resource allocation may be tracked with respect to the allocator client 204. As discussed herein, and according to examples, the processor 102 may store the record in the records store 214 to enable the determined resource allocation to be tracked. According to examples, the allocator function 212 may access the records store 214 while determining resource allocations. In this regard, the allocator function 212 may identify resource allocations that have been made but that have not yet been committed to the placement store stores 216 or the resource map 210. As a result, the allocator function 212 may prevent allocation of the same resource to multiple workloads, e.g., overprovisioning of the resources.

In one regard, through storage of the record in the records store 214, the processor 102 may process additional allocation requests from the allocator clients 204 prior to receipt of acknowledgements from the allocator clients 204 while preventing overprovisioning of the resources, e.g., the resources for which allocations have not been committed to the placement store 216 or updated in the resource map 210. In this regard, the processor 102 may make additional resource allocations prior to receipt of the acknowledgements from the allocator clients 204 regarding prior determined resource allocations.

In addition or in other examples, the records in the records store 214 may enable the determined resource allocation to be undone or otherwise rolled back based on the processor 102 making a determination that the determined resource allocation was not completed, e.g., failed, or based on the processor 102 making a determination that an acknowledgement has not been received from the allocator client 204. However, in other examples, the processor 102 may use the resource allocations stored in the placement store 216 to undo or otherwise roll back resource allocations. In these and other examples, the resource allocations stored in the placement stores 216 may be updated using the information contained in the records store 214.

The processor 102 may fetch, decode, and execute the instructions 118 to send the determined resource allocation to the allocator client 204. In response to receipt of the determined resource allocation, the allocator client 204 may contact a resource inventory provider 206 that manages a set of resources containing the resource that has been allocated in the determined resource allocation to host a particular workload to inform the resource inventory provider 206 that a resource managed by the resource inventory provider 206 will receive the workload corresponding to the determined allocation. In response, the resource inventory provider 206 may begin managing the workload and may send an acknowledgment to the allocator client 204. Following receipt of that acknowledgment, the allocator client 204 may send an acknowledgment to the processor 102 that the determined resource allocation was successfully placed. The resource inventory provider 206 may also update an inventory of resources with the allocation. In addition, the resources inventory provider 206 may send an update to the allocator 202 to update the information contained in the resource map 210.

According to examples, the processor 102 may persist or commit the determined resource allocation to the placement store 216 prior to, during or shortly after sending the determined resource allocation to the allocator client 204. That is, for instance, the processor 102 may persist or commit the determined resource allocation to the placement store 216 prior to the allocator client 204 contacting the resource inventory provider 206 to manage a resource to host or execute a workload. In these examples, the resources may proactively pull the workloads assigned to the resources from the placement store 216 and may access the workloads such that the resources may begin hosting or executing the workloads sooner than if the resources were to wait for the allocator client 204 to communicate with the resource inventory providers 206 to set up the resource allocations. In one regard, execution or hosting of the workloads in this manner may reduce latency in hosting or executing the workloads.

The processor 102 may fetch, decode, and execute the instructions 120 to manage a state of the determined resource allocation using the record stored in the records store 214. Particularly, for instance, the processor 102 may manage the state of the determined resource allocation based on whether the acknowledgment is received from the allocator client 204 and/or the result of the resource allocation identified in the acknowledgement. The state of the determined resource allocation may include, for instance, whether the determined resource allocation was successfully executed, whether the determined resource allocation was unsuccessful, whether an acknowledgement regarding the determined resource allocation was received, etc.

For instance, the processor 102 may, based on receipt of the acknowledgment from the allocator client 204 that the determined resource allocation was successfully placed, delete or clear the record of the determined resource allocation in the records store 214. As a result, the processor 102 may update the state of the resource allocation as having been completed. As the processor 102 may receive the acknowledgment from the allocator client 204 prior to the resource map 210 being updated with the resource allocation, the processor 102 may determine that the allocation was successful more quickly than had the processor 102 waited for the resource map 210 to the updated. In addition, the processor 102 may enable the resource allocation to remain in the placement store 216 such that resource allocation may be executed.

There may, however, be instances in which the allocator client 204 may determine that the resource allocation was unsuccessful. For instance, the allocator client 204 may determine that an acknowledgment was not received from the resource inventory provider 206. In these instances, the allocator client 204 may send an acknowledgment to the processor 102 that indicates that the resource allocation was unsuccessful.

The processor 102 may, based on receipt of the acknowledgment from the allocator client 204 that the placement of the determined resource allocation was unsuccessful, undo or roll back the determined resource allocation for the allocator client 204. In addition, the processor 102 may commit results pertaining to the determined resource allocation for the allocation client being undone in a placement store 216. In one regard, the processor 102 may use the record of the determined resource allocation in the records store 214 to identify the resource allocation and may undo or roll back the resource allocation such that the resource to which the workload was allocated may be returned to the pool of resources available for allocation of a workload. The processor 102 may also allocate another resource to the workload and may repeat the process discussed above.

In addition or in other examples, there may arise issues in the environment 200 that may prevent the processor 102 from receiving the acknowledgement from the allocator client 204. For instance, the allocator client 204 may fail to receive the determined resource allocation from the processor 102, the allocator client 204 may fail to communicate with the resource inventory provider 206, the resource inventory provider 206 may fail to communicate with the allocator client 204, the allocator client 204 may fail to communicate with the processor 102, and/or the like. These failures may be caused by failures in communications links and/or by failures in the allocator client 204, resource inventory provider 206, or the like.

According to examples, the processor 102 may, based on a determination that the acknowledgement from the allocator client 204 was not received, e.g., within a predefined period of time from when the determined resource allocation was sent, undo or roll back the determined resource allocation for the allocator client 204. The predefined period of time may be based on a normal amount of time that the allocator client 204 takes to send an acknowledgement and may be on the order of a few milliseconds, a few seconds, or the like. In addition, the processor 102 may commit results pertaining to the determined resource allocation for the allocation client being undone in a placement store 216. In one regard, the processor 102 may use the record of the determined resource allocation in the records store 214 to identify the resource allocation and may undo or roll back the resource allocation such that the resource to which the workload was allocated may be returned to the pool of resources available for allocation of a workload.

Through management of the state of the determined resource allocation as discussed above, the processor 102 may process multiple allocation requests 218 received from multiple allocator clients 204 without having to wait for receipt of acknowledgements from the allocator clients 204. That is, the processor 102 may process each of the allocation requests 218 in sequence in a more rapid manner than in instances in which the processor 102 may wait to process a next allocation request 218 until an acknowledgement regarding a previous resource allocation response is received. The processor 102 may also process the multiple allocation requests while avoiding overprovisioning of the resources through use of the resource store 214 discussed herein.

In addition, the processor 102 may update the states of the resource allocations and thus the states of the resources both when acknowledgements are received and when acknowledgements are not received from the allocator clients 204. As the resources for which allocations have not been successful may be identified at a faster rate and the resource map 210 may be updated with more current information than may be possible from information tracked by the resource inventory providers 206 or in the placement stores 216, the processor 102 may execute the allocator function 212 using the latest states of the resources, which may lead to more efficient allocation of resources.

Although a single apparatus 100 has been depicted in FIGS. 1 and 2, it should be understood that multiple apparatuses having similar or different configurations with respect to the apparatus 100 may be implemented to perform the functions discussed above. Thus, for instance, each of the multiple apparatuses 100 may operate in parallel with each other to allocate a larger number of resources to workloads over a shorter period of time as compared with a single apparatus 100 performing the same functions.

Figure 3:
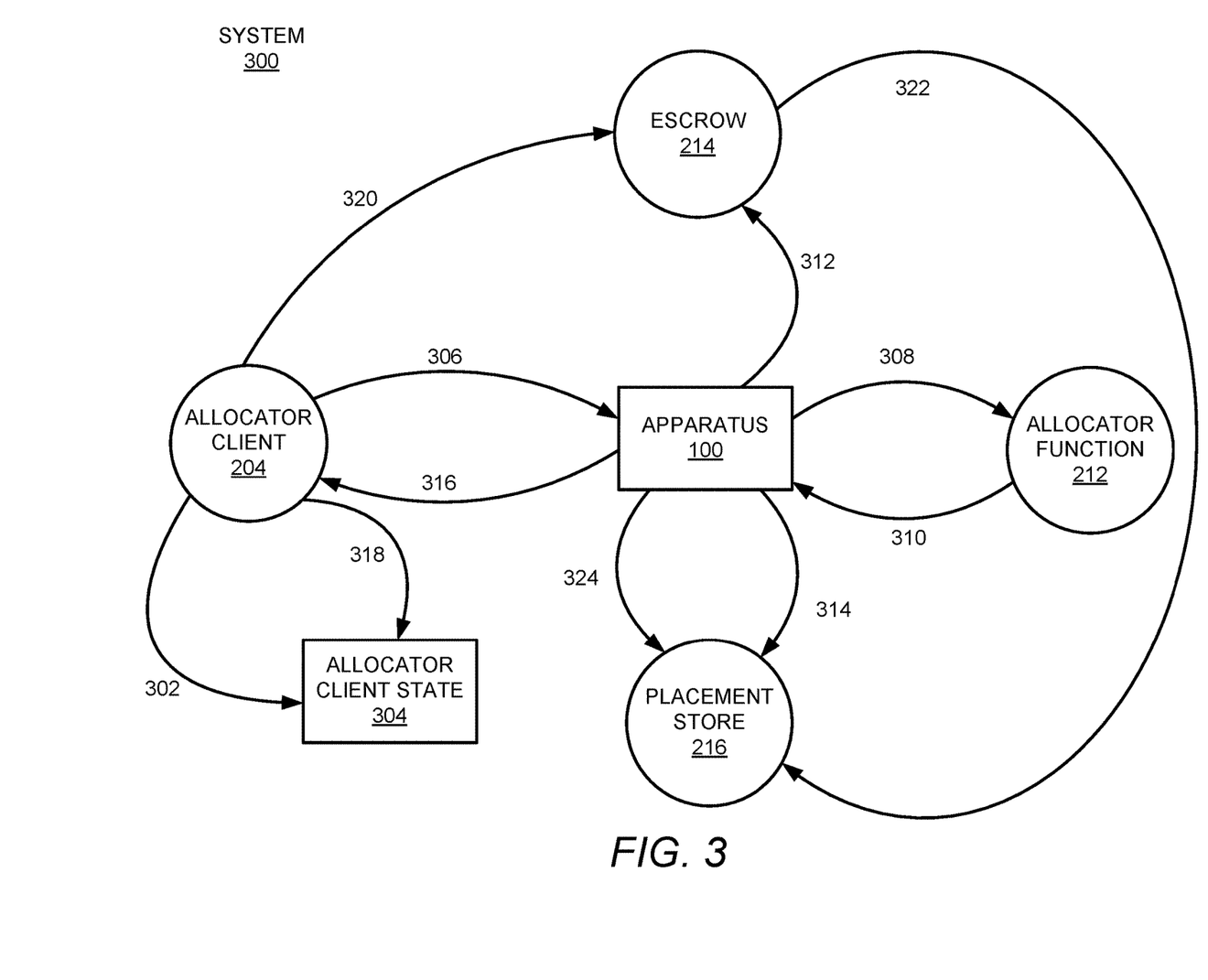
FIG. 3 depicts a process flow diagram of a system for managing allocation of resources in accordance with an embodiment of the present disclosure.

Turning now to FIG. 3, there is shown a process flow diagram of a system 300 for managing allocation of resources in accordance with an embodiment of the present disclosure. It should be understood that the system 300 depicted in FIG. 3 may include additional features and that some of the features described herein may be removed and/or modified without departing from the scope of the system 300.

The system 300 may include the apparatus 100, which may include the processor 102 as discussed above with respect to FIGS. 1 and 2. The system 300 may also include the allocator client 204, the allocator function 212, the escrow 214 (records store 214), and the placement store 216 from FIG. 2. These components may function in similar manners to those discussed above with respect to FIGS. 1 and 2. However, the system 300 may include additional features as discussed herein.

Initially, the allocator client 204 may receive a request from a customer 205 for a workload to be performed, executed, hosted, changed, updated, or the like. The allocator client 204 may generate an allocation ID for the received request. In addition, the allocator client 204 may persist 302 the allocation ID locally as part of the allocator client state 304. The allocator client 204 may generate an allocation request 218 and may send 306 the allocation request 218 to the apparatus 100, e.g., the processor 102. Based on receipt of the allocation request 218, the processor 102 may execute the instructions 112-120 as discussed herein to determine a resource allocation for the allocation request, perform bookkeeping of a record of the resource allocation, return the resource allocation to the allocator client 204, as well as other operations.

Particularly, for instance, the processor 102 may execute the instructions 114 to determine the resource allocation for the allocation request. This process is represented by the reference numerals 308 and 310. The processor 102 may execute the instructions 116 to store 312 a record of the determined resource allocation in the escrow 214. The processor 102 may also apply the results of the resource allocation determination to the placement store 216. That is, for instance, the processor 102 may update the placement store 216 to identify the resource that has been allocated to accept the workload, e.g., may commit the resource allocation to the placement store 216. As a result, for instance, that resource may not be allocated to accept another workload until the current workload is completed.

The processor 102 may execute the instructions 118 to send 316 the determined resource allocation to the allocator client 204. The allocator client 204 may persist 318 the resource allocation locally and may commit the resource allocation. The allocator client 204 may determine whether the resource allocation has been successfully committed to the allocated resource. Based on a determination that the resource allocation has successfully been committed, the allocator client 204 may send 320 an acknowledgment to the apparatus 100 to indicate the successful placement of the workload on the allocated resource. However, based on a determination that the resource allocation has not successfully been committed, the allocator client 204 may also send 320 an acknowledgement to the apparatus 100 to indicate the unsuccessful placement of the workload on the allocated resource.

The processor 102 may execute the instructions 120 to manage the state of the determined resource allocation using the record of the determined resource allocation stored in the records store 214. For instance, if the processor 102 receives an acknowledgement that the resource allocation was placed successfully on the allocated resource, the processor 102 may remove the record of the determined resource allocation from the escrow 214. In this instance, the processor 102 may maintain the state of the resource allocation as currently stored in the placement store 216. However, if the processor 102 receives an acknowledgment that the resource allocation was not placed successfully, or that an acknowledgment responsive to the sending of the determined resource allocation to the allocator client 204 was not received within a predefined time period, the processor 102 may undo the determined resource allocation. That is, for instance, the processor 102 may undo the determined resource allocation as identified in the escrow 214. In other examples, the processor 102 may undo the determined resource allocation as identified in the placement store 216. The processor 102 may also commit 322, 324 the change in resource allocation in the placement store 216.

Figure 4:
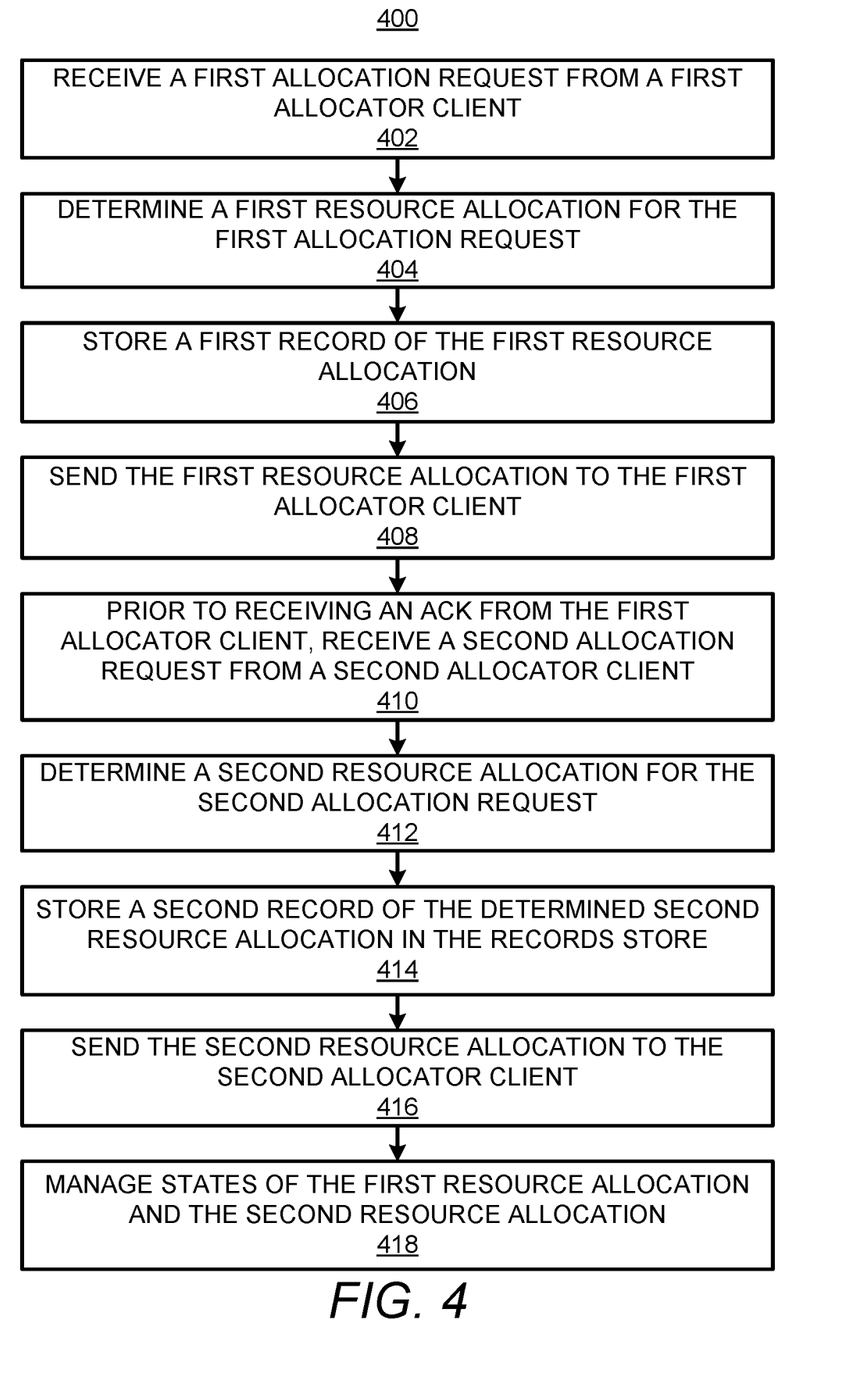
FIG. 4 depicts a flow diagram of a method for managing allocation of resources in accordance with an embodiment of the present disclosure.

Various manners in which the processor 102 may operate are discussed in greater detail with respect to the method 400 depicted in FIG. 4. Particularly, FIG. 4 depicts a flow diagram of a method 400 for managing allocation of resources in accordance with an embodiment of the present disclosure. It should be understood that the method 400 depicted in FIG. 4 may include additional operations and that some of the operations described therein may be removed and/or modified without departing from the scope of the method 400. The description of the method 400 is made with reference to the features depicted in FIGS. 1-3 for purposes of illustration.

At block 402, the processor 102 may receive a first allocation request from a first allocator client 204. At block 404, the processor 102 may determine a first resource allocation for the first allocation request. At block 406, the processor 102 may store a first record of the first resource allocation in a records store 214. At block 408, the processor 102 may send the first resource allocation to the first allocator client 204.

At block 410, prior to receiving an acknowledgment to the sent first resource allocation from the first allocator client 204, the processor 102 may receive a second allocation request from a second allocator client 204. At block 412, the processor 102 may determine a second resource allocation for the second allocation request. At block 414, the processor 102 may store a second record of the determined second resource allocation in the records store 214. At block 416, the processor 102 may send a second resource allocation to the second allocator client 204.

In addition, or in other examples, the processor 102 may store the first record and the second record in the placement store 216. In these examples, the resources may proactively pull the resource allocations for the resources from the placement store 216 and begin executing, hosting, etc., the workloads allocated to the resources. As such, for instance, the latencies associated with executing or hosting the workloads may be reduced through implementation of these examples.

In any regard, at block 418, the processor 102 may manage a state of the first resource allocation and a state of the second resource allocation. Particularly, the processor 102 may manage the states of the first resource allocation and the second resource allocation based on whether acknowledgements are received from the first allocator client and/or the second allocator client. As part of managing the states, the processor 102 may maintain resource allocations that are successful and may undo resource allocations that are unsuccessful or resource allocations whose results are unverified.

For instance, the processor 102 may determine whether an acknowledgement is received from the first allocator client 204. Based on a determination that the acknowledgment is received from the first allocator client 204, the processor 102 may identify whether the first resource allocation was successful or was unsuccessful from the received acknowledgment. That is, the acknowledgment may include an indication as to whether or not the first resource allocation was successful. In addition, based on an identification that the first resource allocation was successful, the processor 102 may delete the first record in the records store 214.

However, based on a determination that the acknowledgment was received and that the acknowledgment indicates that the first resource allocation was unsuccessful or based on a determination that the acknowledgment was not received from the first allocator client 204, the processor 102 may undo the first resource allocation. That is, for instance, the processor 102 may use the first record of the first resource allocation stored in the records store 214 to roll back the first resource allocation. In addition, the processor 102 may commit the results pertaining to the first resource allocation for the first allocator client 204 being undone in a placement store 216. In one regard, therefore, the previously allocated resource may be returned to the pool of available resources to which the processor 102 may allocate a workload.

According to examples, the processor 102 may receive inventory information from a plurality of resource inventory providers 206 and the processor 102 may update a resource map 210 based on the received resource inventory information. The processor 102 may also update the resource map 210 using information contained in the placement stores 216.

Some or all of the operations set forth in the method 400 may be included as utilities, programs, or subprograms, in any desired computer accessible medium. In addition, the method 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a processor; and
   a memory on which is stored machine readable instructions that are to cause the processor to:
   receive an allocation request from an allocator client;
   determine a resource allocation for the received allocation request;
   store a record of the determined resource allocation in a records store;
   send the determined resource allocation to the allocator client, wherein the allocator client is to send an acknowledgement to the apparatus in response to receipt of the determined resource allocation sent by the apparatus;
   determine whether the acknowledgement is received from the allocator client; and
   manage a state of the determined resource allocation using the record stored in the records store based on whether the acknowledgement is received from the allocator client.

2. The apparatus of claim 1, wherein the instructions are further to cause the processor to:
   based on a determination that the acknowledgement is received, identify whether the determined resource allocation was successful or was unsuccessful from the received acknowledgement.

3. The apparatus of claim 2, wherein the instructions are further to cause the processor to:
   based on an identification that the determined resource allocation was successful, delete the record in the records store.

4. The apparatus of claim 1, wherein to manage the state of the determined resource allocation, the instructions are further to cause the processor to:
   determine that the acknowledgement was not received from the allocator client;
   undo, using the record of the determined resource allocation stored in the records store, the determined resource allocation for the allocator client based on a determination that the acknowledgement was not received; and
   commit results pertaining to the determined resource allocation for the allocator client being undone in a placement store.

5. The apparatus of claim 1, wherein to manage the state of the determined resource allocation, the instructions are further to cause the processor to:
   determine, based on a determination that the acknowledgement is received, that the determined resource allocation was unsuccessful;
   undo, using the record of the determined resource allocation in the records store, the determined resource allocation for the allocator client based on a determination that the determined resource allocation was unsuccessful; and
   commit results pertaining to the determined resource allocation for the allocator client being undone in a placement store.

6. The apparatus of claim 1, wherein the instructions are further to cause the processor to:
   receive a plurality of allocation requests from a plurality of allocator clients;
   determine resource allocations for the received plurality of allocation requests;
   store records of the determined resource allocations in the records store;
   send the determined resource allocations respectively to the plurality of allocator clients, wherein acknowledgements to the sent determined resource allocations are to be received from the plurality of allocator clients; and
   manage states of the determined resource allocations using the records stored in the records store based on whether the acknowledgements are received from the plurality of allocator clients.

7. The apparatus of claim 1, wherein the instructions are further to cause the processor to:
   receive a first allocation request from a first allocator client;
   determine a first resource allocation for the received first allocation request;
   store a first record of the determined first resource allocation in the records store;
   send the determined first resource allocation to the first allocator client;
   prior to receipt of an acknowledgement to the determined first resource allocation,
   receive a second allocation request from a second allocator client; and
   determine a second resource allocation for the received second allocation request.

8. The apparatus of claim 1, wherein the instructions are further to cause the processor to:
   receive resource inventory information from a plurality of resource inventory providers; and
   update a resource map based on the received resource inventory information.

9. The apparatus of claim 1, wherein the instructions are further to cause the processor to:
   prior to receipt of the acknowledgement to the sent determined resource allocation from the allocator client, commit the determined resource allocation to a placement store, wherein a resource is to pull a workload from the placement store corresponding to the committed resource allocation for the resource.

10. A method comprising:
    receiving, by a processor, a first allocation request from a first allocator client;
    determining, by the processor, a first resource allocation for the received first allocation request;

storing, by the processor, a first record of the first resource allocation in a records store;
sending, by the processor, the first resource allocation to the first allocator client, wherein the first allocator client is to send an acknowledgement to the apparatus in response to receipt of the first resource allocation from the processor;
prior to receiving the acknowledgement from the first allocator client, by the processor,
receiving a second allocation request from a second allocator client;
determining a second resource allocation for the second allocation request;
storing a second record of the determined second resource allocation in the records store;
sending the second resource allocation to the second allocator client, wherein the second allocator client is to send an acknowledgement to the apparatus in response to receipt of the second resource allocation from the processor;
determining whether the acknowledgement is received from the first allocator client or the second allocator client; and
managing a state of the first resource allocation and a state of the second resource allocation using the first record and the second record stored in the records store based on whether the acknowledgements are received from the first allocator client or the second allocator client.

11. The method of claim 10, further comprising:
based on a determination that the acknowledgement is received from the first allocator client, identifying whether the first resource allocation was successful or was unsuccessful from the received acknowledgement.

12. The method of claim 11, further comprising:
based on an identification that the first resource allocation was successful, deleting the first record in the records store.

13. The method of claim 10, wherein managing the state of the first resource allocation further comprises:
determining that the acknowledgement was not received from the first allocator client;
undoing, using the first record of the first resource allocation stored in the records store, the first resource allocation for the first allocator client based on a determination that the acknowledgement was not received; and
committing results pertaining to the first resource allocation for the first allocator client being undone in a placement store.

14. The method of claim 10, wherein managing the state of the first resource allocation further comprises:
determining, based on a determination that the acknowledgement is received, that the first resource allocation was unsuccessful;
undoing, using the first record of the first resource allocation in the records store, the first resource allocation for the first allocator client based on a determination that the first resource allocation was unsuccessful; and
committing results pertaining to the first resource allocation for the first allocator client being undone in a placement store.

15. The method of claim 10, further comprising:
receiving resource inventory information from a plurality of resource inventory providers; and
updating a resource map based on the received resource inventory information.

16. A non-transitory computer readable medium on which is stored machine readable instructions that when executed by a processor, cause the processor to:
receive a plurality of resource allocation requests from a plurality of allocator clients;
determine respective resource allocations for the plurality of resource allocation requests;
store records of the resource allocations in an escrow;
send the resource allocations to the allocator clients according to the allocator clients that submitted the resource allocation requests, wherein the allocator clients are to send acknowledgements to the processor in response to receipt of the resource allocations;
determine whether acknowledgements are received from the allocator clients; and
manage states of the resource allocations using the records stored in the escrow based on whether acknowledgements to the sent resource allocations are received from the allocator clients.

17. The non-transitory computer readable medium of claim 16, wherein to manage the states of the resource allocations, the instructions are further to cause the processor to:
determine whether an acknowledgement is received from a first allocator client of the plurality of allocator clients;
based on a determination that the acknowledgement is received from the first allocator client, identify whether a first resource allocation for the first allocator client was successful or was unsuccessful from the received acknowledgement; and
based on an identification that the first resource allocation was successful, delete the first record in the records store.

18. The non-transitory computer readable medium of claim 17, wherein to manage the states of the resource allocations, the instructions are further to cause the processor to:
determine that the acknowledgement was not received from the first allocator client;
undo, using the first record of the first resource allocation stored in the records store, the first resource allocation for the first allocator client based on a determination that the acknowledgement was not received; and
commit results pertaining to the first resource allocation for the first allocator client being undone in a placement store.

19. The non-transitory computer readable medium of claim 17, wherein to manage the states of the resource allocations, the instructions are further to cause the processor to:
determine, based on a determination that the acknowledgement is received, that the first resource allocation was unsuccessful;
undo, using the first record of the first resource allocation in the records store, the first resource allocation for the first allocator client based on a determination that the first resource allocation was unsuccessful; and
commit results pertaining to the first resource allocation for the first allocator client being undone in a placement store.

20. The non-transitory computer readable medium of claim 16, wherein the instructions are further to cause the processor to:
receive resource inventory information from a plurality of resource inventory providers; and update a resource map based on the received resource inventory information.

\* \* \* \* \*